April 14, 1964

K. E. WOOD 3,129,355

LINEAR MAGNETIC SWEEP GENERATOR

Filed July 7, 1961

WITNESSES

INVENTOR
Kenneth E. Wood
BY
ATTORNEY

United States Patent Office 3,129,355
Patented Apr. 14, 1964

3,129,355
LINEAR MAGNETIC SWEEP GENERATOR
Kenneth E. Wood, Severna Park, Md., assignor to Westinghouse Electric Corporation, East Pittsburgh, Pa., a corporation of Pennsylvania
Filed July 7, 1961, Ser. No. 122,458
8 Claims. (Cl. 315—27)

The present invention relates to sweep generators, and more particularly to linear magnetic sweep generators.

In a magnetic deflection circuit, the deflection on the cathode ray tube is directly proportional to the flux produced in the deflection coils. Therefore, in order to have a linear sweep with respect to time across the screen, the flux produced in the deflection coils must increase linearly with time. The sweep in conventional magnetic deflection circuits is linearized by feedback taken from the current flowing in the magnetic deflection coils. The magnetic flux is assumed to vary linearly with the current; however, in actuality because of non-linearities in the magnetic circuitry and other components used, this relationship does not hold true above a certain order of accuracy. Thus, it would be desirable to provide a feedback voltage for comparing purposes that is directly proportional to the flux produced in the deflection coils, rather than the current flowing therein.

It is, therefore, an object of the present invention to provide a new and improved linear magnetic sweep generator wherein a feedback voltage directly proportional to the magnetic flux in the deflection coil is utilized.

It is a further object of the present invention to provide a new and improved linear magnetic sweep generator in which a Hall generator device is utilized to provide a feedback voltage directly proportional to the magnetic flux in the deflection coil.

The present invention broadly provides a magnetic sweep generator wherein, a linear sweep of flux as a function of time is maintained. A Hall device has the characteristics that its output voltage is proportional to the product of the current passing therethrough and the magnetic field strength applied transverse to the current direction, and so by maintaining a constant current, the output voltage of the Hall generator device will then be directly proportional to the magnetic field applied thereto. With the Hall generator device disposed in the magnetic field, the deflection coils and so being used as a sensing device for the magnitude of the magnetic field produced by the current flowing in the deflection coils, the output voltage of the Hall generator device is utilized as a feedback voltage proportional to the flux produced by the deflection coil. A linear flux sweep with time is then provided by using the feedback voltage to control the current in the deflection coils.

These and other objects will become more apparent when considered in view of the following specification and drawing, in which.

Figure 1:
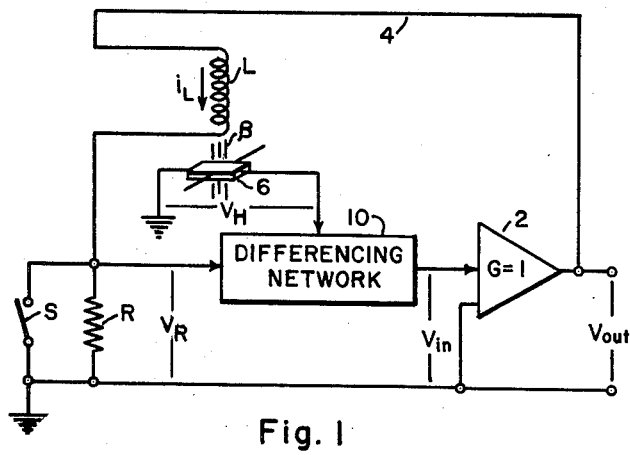
FIGURE 1 is a schematic-block diagram of an embodiment of the present invention.

Referring to FIG. 1, the amplifier 2 has a gain G in its quiescent state of substantially one. In the feedback loop 4 of the amplifier 2, a magnetic deflection coil L is provided. A Hall generator device 6 is disposed in the magnetic field $\beta$ of the magnetic deflection coil L. The Hall generator device 6 is supplied by a constant direct current source, not shown. Connected to the magnetic deflection coil L is the resistor R to complete the deflection circuit to the common line 8. A differencing network 10 receives the output voltage of the Hall generator device 6, and the voltage developed across the resistor R with respect to ground. The difference voltage from the network 10 is then applied to the input of the amplifier 2 where the input voltage is:

$$V_{in} = V_R - V_H$$

with $V_R$ being the voltage across the resistor R and $V_H$ the Hall output voltage. When the switch S is opened the current $i_L$ begins to flow in the deflection circuit causing a voltage to be developed across the resistor R. This voltage begins to develop at a rate $R/L$. In the absence of the Hall generator device 6, the circuit functions substantially as a "bootstrap" circuit, so that, with the gain of the amplifier 2 being substantially unity, the current $i_L$ and voltage $V_R$ will be a linear function of time and the flux developed in the coil L will be linear in time.

Figure 2:
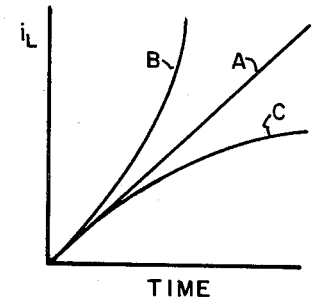
FIG. 2 is a plot of the current through the deflection coil versus time for various circuit parameters.

FIG. 2 shows the desired plot of current $i_L$ in the deflection coil L as a function of time in curve A. Curve B shows the condition when the gain of the amplifier 2 is greater than unity, and causes the current $i_L$ to rise in a positive exponential manner more rapidly than is desired. Curve C shows the condition when the gain of the amplifier 2 is less than unity and causes the current $i_L$ to rise less rapidly in time along a negative exponential. Thus, in order to maintain a linear sweep, if the current or flux of the coil is too large for linearity, the feedback error voltage must be made larger in order to reduce the current and flux in the coil, and vice versa, if the current or flux is too small, the feedback voltage must be decreased to increase the current and flux.

The Hall voltage output $V_H$ from the Hall generator 6 is proportional to the magnitude of the flux produced by the deflection coil L, assuming a constant D.C. excitation. As it will be seen, when the Hall voltage is subtracted from the voltage $V_R$ across the resistor R and the difference voltage $V_{in}$ applied to the amplifier 2, a control of the current and so the flux in the deflection coil L will then be obtained. Without the Hall generator 6 in the circuit the current through the deflection coil L may be written as:

$$i_L = \int \frac{I_L R}{L} e^{-\frac{R}{L}(1-G)t} dt$$

or, $$i_L = \int \frac{I_L R}{L} e^{-\frac{R}{L}\left(1-\frac{V_{out}}{V_R - V_H}\right)t} dt$$

where $I_L$ is the steady state current in the coil L. From these equations it can be seen if the gain G of the amplifier 2 is kept at unity the current $I_L$ will remain a linear function of time. If, for example, the voltage across the resistor R should increase, the power of the exponential $$\left(1 - \frac{V_{out}}{V_R - V_H}\right)$$

would become negative giving a positive exponential current rise with time. The current $I_L$ would increase and thus increase the magnetic field generated by the deflection coil L, which would increase the voltage output of the Hall generator $V_H$ and tend to bring the gain of the amplifier 2 back to unity, so as to obtain a linear sweep as a function of time. Conversely, if the voltage $V_R$ should decrease across the resistor R the power of the exponential $$\left(1 - \frac{V_{out}}{V_R - V_H}\right)$$

would become greater than one making the sign of the power negative, and giving a negative exponential rise. The current $I_L$ through the deflection coil L would decrease and decrease the flux passing through the Hall generator 6 and decrease the Hall output voltage $V_H$ so that the ratio of $$\frac{V_{ont}}{V_R - V_H}$$

would tend to stay at one, to provide a linear sweep. It should be noted that the feedback voltage $V_H$ from the Hall generator 6 is dependent on the actual flux generated in the deflection coil and not on the current passing through the coil so there need not be an assumption of linearity between the current and flux in the deflection coil L in order to maintain a linear sweep of flux with time.

Figure 3:
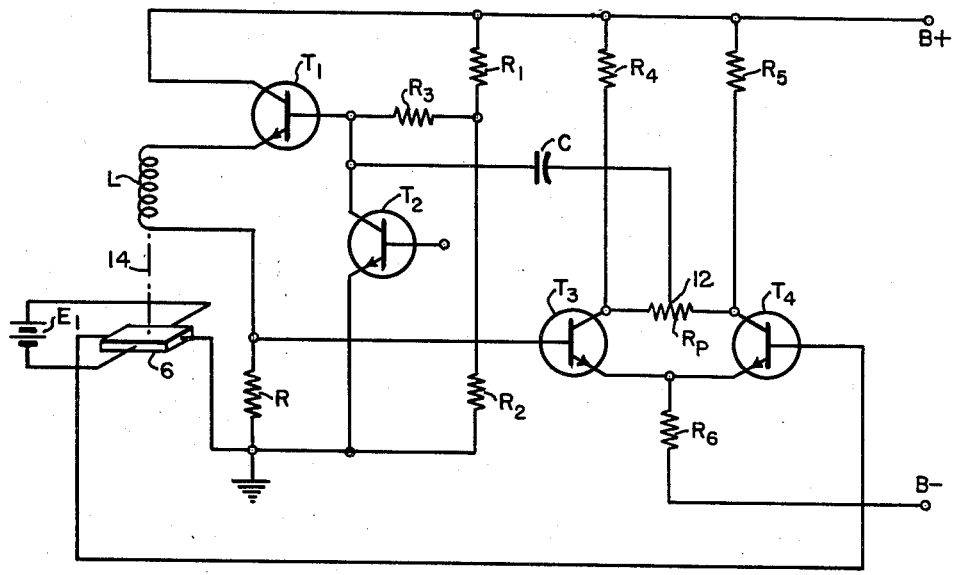
FIG. 3 is a schematic diagram of an embodiment of the present invention.

FIG. 3 is a schematic diagram of a specific embodiment of the present invention in which the deflection coil L is connected to the resistor R, to provide a desired time constant $L/R$. The initial applied voltage is defined by the resistors $R_1$ and $R_2$ connected between B+ and ground. The base of transistor $T_1$ is, however, clamped through the normally conducting transistor $T_2$ to ground, with the conducting path being through the resistor $R_1$, the resistor $R_3$ and the transistor $T_2$ to ground. In order to initiate a sweep cycle the transistor $T_2$ is pulsed to its non-conducting state so that the base of the transistor $T_1$ becomes unclamped and is rendered conductive so that the current $I_L$ may begin to flow through the deflection circuit including the coil L and the resistor R, which causes voltage to be developed across the resistor R. The transistors $T_3$ and $T_4$ are connected as a differential amplifier, i.e. the output voltage taken from the tap 12 on the potentiometer $R_p$ is proportional to the difference between the voltages applied to the bases of the transistors $T_3$ and $T_4$. The transistors $T_3$ and $T_4$ are biased through their collector terminals from B+ through the resistors $R_4$ and $R_5$, respectively, and the emitters of the transistors $T_3$ and $T_4$ are connected through the resistor $R_6$ to B−. The gain of the differential amplifier may be adjusted through the tap 12 on the potentiometer $R_p$. Tap 12 is connected through the coupling capacitor C to the base of the transistor $T_1$. The deflection coil L and the Hall generator device 6 are shown magnetically coupled through the dotted line 14, which indicates that the Hall generator 6 is placed in the magnetic field of the deflection coil L. A battery $E_1$ is shown connected to the current terminals of the Hall generator 6 to provide a constant D.C. current therethrough. The voltage output $V_H$ of the Hall generator 6 is then applied to the base of the transistor $T_4$. Therefore, the voltage $V_R$ developed across the resistor R is applied to the base of transistor $T_3$ and the Hall output voltage $V_H$ is applied to the transistor $T_4$, so the difference voltage $V_{in}$ may be taken from the potentiometer $R_p$ and is applied to the base of transistor $T_1$ as a feedback voltage to control the current $I_L$ flowing through the deflection coil L, increasing or decreasing the flux generated therein to maintain a linear sweep of flux as a function of time.

Although the present invention has been described with a certain degree of particularity, it should be understood that the present disclosure has been made only by way of example and that numerous changes in the detail of circuitry in the combination of arrangement of elements may be resorted to without departing from the scope and the spirit of the present invention.

I claim as my invention:

1. A sweep generator including, amplifying means having a feedback loop and substantially unity gain, an inductor operatively connected in said feedback loop, sweep means operatively connected across said inductor and said amplifying means and being operative to effect the starting and stopping of a sweep cycle to provide a voltage, Hall generator means disposed in the magnetic field of said inductor and being operative to provide an output voltage proportional to the magnetic field applied thereto, and differencing means to supply said amplifying means with the difference voltage between the voltage developed during the sweep cycle and the output voltage provided by said Hall generator means.

2. A sweep generator including, amplifying means having a feedback loop and substantially unity gain, an inductor operatively connected in said feedback loop, a resistor operatively connected to said inductor, sweep means operatively connected across said inductor and resistor to effect the starting and stopping of a sweep cycle, a Hall generator device disposed in the magnetic field of said inductor and being operative to provide an output voltage proportional to the magnetic field applied thereto, and differencing means to supply said amplifying means with the difference voltage between the voltage developed across said resistor during the sweep cycle and the output voltage provided by said Hall generator device.

3. A sweep generator including, differencing amplifier means having a feedback loop and being operative to provide substantially unity gain between its output voltage and the difference voltage between its input voltages, a magnetic deflection coil operatively connected in said feedback loop, a resistor operatively connected to said coil to form a circuit having a predetermined time constant, sweep means operatively connected to said circuit to effect the starting and stopping of a sweep cycle, a Hall generator device disposed in the magnetic field of said deflection coil and being operative to provide an output voltage proportional to the magnetic field applied thereto, with said differencing amplifier means operatively connected to supply an output voltage substantially equal to the difference voltage between the voltage developed across the resistor during the sweep cycle and the output voltage provided by said Hall generator device.

4. A sweep generator for magnetic deflection apparatus including, amplifying means having input and output terminals and substantially unity gain, a magnetic deflection coil operatively connected between said input and output terminals, a resistor operatively connected to said coil to form a circuit having a predetermined time constant, sweep means connected across said circuit to effect the starting and stopping of a sweep cycle, a Hall generator device disposed in the magnetic field of said deflection coil and being operative to provide an output voltage proportional to the magnetic field applied thereto, and differencing means operatively connected to supply to said input terminals of said amplifying means the difference voltage between the voltage developed across said resistor during the sweep cycle and the voltage provided by said Hall generator device in order to maintain said amplifying means at substantially unity gain.

5. A sweep generator for magnetic deflection apparatus including, differencing amplifier means having a feedback loop and being operative to provide an output voltage substantially equal to the difference between the input voltages applied thereto, a magnetic deflection coil operatively connected in said feedback loop, a resistor operatively connected to said coil to form a circuit having a predetermined time constant, sweep means connected across said circuit to effect the starting and stopping of a sweep cycle so that a voltage varying linearly in time is developed across said resistor, and a Hall generator device disposed in the magnetic field of said deflection coil and being operative to provide an output voltage proportional to the magnetic field applied thereto, with said differencing amplifier means operatively connected to receive as input voltages the voltage developed across said resistor during the sweep cycle and the output voltage provided by said Hall generator device and to provide an output voltage at unity gain with respect to said input voltages.

6. A sweep generator comprising in combination: amplifier means having a feedback loop and substantially unity gain; a deflection coil operatively connected in said feedback loop; a resistor operatively connected to said inductor forming an RL charging circuit; sweep means operatively connected across said inductor and resistor to effect initiation and termination of a sweep cycle; a Hall generator device proximately disposed within the magnetic field of said deflection coil and being operative to provide an output voltage directly proportional to the magnetic field applied thereto; and differential amplifier means operatively connected to said amplifying means for supplying a differential voltage thereto, said voltage being the difference between the voltage developed across said resistor during said sweep cycle and said output voltage provided by said Hall generator for maintaining the magnetic flux in linear relationship with respect to time during said sweep cycle.

7. Magnetic sweep generator apparatus comprising in combination: a magnetic deflection coil; a resistor connected in series with said deflection coil for forming an RL deflection circuit, said resistor developing a voltage thereacross proportional to the driving current flowing in said deflection coil; a substantially unity gain amplifier operably connected to said deflection circuit providing a bootstrap circuit; a sweep means connected to said bootstrap circuit for controlling the charging and discharging time of said deflection circuit which defines a sweep cycle; a Hall generator including means for connection to a source of substantially constant electric potential for maintaining the flow of current therethrough substantially constant and being disposed proximately to said deflection coil so as to intersect the flux linkage of said deflection coil for providing a Hall voltage output directly proportional in magnitude to said flux linkages; a differential amplifier connected in said bootstrap circuit having inputs for receiving said voltage across said resistor and said Hall output voltage and providing an output signal therefrom to provide a correctional voltage to said unity gain amplifier for controlling said flux linkages of said magnetic coil so that a linear relationship of magnetc field with respect to time is maintained regardless of non-linearities in the presently claimed circuitry.

8. Magnetic deflection apparatus comprising in combination: a magnetic deflection coil, a resistance connected in series with said deflection coil; a substantially unity gain amplifier connected to said deflection coil and said resistor to provide a sweep current for said deflection coil, said deflection coil and said resistance combining with said unity gain amplifier to form a bootstrap circuit; sweep means connected to said bootstrap circuit for starting and stopping said sweep current and establishing a predetermined sweep cycle thereby; a Hall generator disposed within a magnetic field generated by said deflection coil and being operatively connected to a source of electrical potential for providing a constant current therethrough and providing an output voltage directly proportional to the magnitude of said magnetic field; a differential amplifier circuit being connected to said bootstrap circuit having first and second input terminals; said first input terminal being adapted to receive a voltage developed across said resistor and said second input terminal being adapted to receive the output voltage from said Hall generator, said differential amplifier further providing a control voltage to said unity gain amplifier for maintaining a linear increase of magnetic flux in said deflection coil over said sweep cycle.

References Cited in the file of this patent
UNITED STATES PATENTS

| | | |
|---|---|---|
| 2,521,741 | Parker | Sept. 12, 1950 |
| 2,913,625 | Finkelstein | Nov. 17, 1959 |
| 3,004,188 | Van Hutten | Oct. 10, 1961 |